(12) United States Patent
Kim et al.

(10) Patent No.: US 11,891,329 B2
(45) Date of Patent: Feb. 6, 2024

(54) WINDOW AND METHOD OF MANUFACTURING THE SAME

(71) Applicant: SAMSUNG DISPLAY CO., LTD., Yongin-si (KR)

(72) Inventors: Seung Kim, Seongnam-si (KR); Byunghoon Kang, Hwaseong-si (KR); Seungho Kim, Asan-si (KR); Youngok Park, Hwaseong-si (KR); Sujin Sung, Hwaseong-si (KR); Gyuin Shim, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 518 days.

(21) Appl. No.: 16/861,791

(22) Filed: Apr. 29, 2020

(65) Prior Publication Data

US 2020/0377408 A1 Dec. 3, 2020

(30) Foreign Application Priority Data

May 30, 2019 (KR) .......................... 10-2019-0063793

(51) Int. Cl.
*C22C 21/08* (2006.01)
*C22F 1/047* (2006.01)
(Continued)

(52) U.S. Cl.
CPC ............ *C03C 21/002* (2013.01); *C03B 18/04* (2013.01); *C03B 27/03* (2013.01); *C03C 3/04* (2013.01);
(Continued)

(58) Field of Classification Search
CPC ......... C03C 21/002; C03C 3/04; C03B 18/04; C03B 27/03; G06F 1/1637
(Continued)

(56) References Cited

U.S. PATENT DOCUMENTS 9,487,434 B2 11/2016 Amin et al.
9,567,254 B2 2/2017 Amin et al.
(Continued)

FOREIGN PATENT DOCUMENTS

CN 105873871 8/2016
CN 108046613 5/2018
(Continued)

*Primary Examiner* — Tahseen Khan
(74) *Attorney, Agent, or Firm* — F. CHAU & ASSOCIATES, LLC

(57) ABSTRACT

A window includes a base region and a compressive stress region disposed on the base region. The compressive stress region includes $Li^+$, $Na^+$, and $K^+$ ions. The compressive stress region includes a first compressive stress portion in which a concentration of the $K^+$ ions decreases, a concentration of $Na^+$ ions increases, and a concentration of the $Li^+$ ions increases, from a surface of the window toward the base region. A second compressive stress portion is adjacent to the first compressive stress portion. In the second compressive stress portion, the concentration of the $Na^+$ ion decreases and the concentration of the $Li^+$ ion increases, from the first compressive stress portion toward the base region. The window thereby has a high surface compressive stress value and impact resistance.

14 Claims, 10 Drawing Sheets

(51) Int. Cl.
  *C03C 21/00* (2006.01)
  *C03B 18/04* (2006.01)
  *C03B 27/03* (2006.01)
  *G06F 1/16* (2006.01)
  *C03C 3/04* (2006.01)
  *C03C 3/083* (2006.01)
  *G02F 1/1333* (2006.01)

(52) U.S. Cl.
  CPC ............ *C03C 3/083* (2013.01); *G06F 1/1637* (2013.01); *C03C 2203/24* (2013.01); *G02F 1/133331* (2021.01); *G06F 2200/1634* (2013.01); *Y10T 428/315* (2015.01)

(58) Field of Classification Search
  USPC ....................................................... 428/220
  See application file for complete search history.

(56) References Cited

U.S. PATENT DOCUMENTS

| | | | |
|---|---|---|---|
| 9,593,042 | B2 | 3/2017 | Hu et al. |
| 9,718,727 | B2 | 8/2017 | Bookbinder et al. |
| 10,071,933 | B2 | 9/2018 | Wang et al. |
| 10,351,471 | B2 | 7/2019 | Meinhardt et al. |
| 10,442,730 | B2 | 10/2019 | Allan et al. |
| 10,752,542 | B2 | 8/2020 | Bookbinder et al. |
| 2013/0219966 | A1 | 8/2013 | Hasegawa et al. |
| 2015/0062949 | A1 | 2/2015 | Bayne et al. |
| 2016/0326050 | A1* | 11/2016 | Lee ........ C03C 21/002 |
| 2017/0166478 | A1 | 6/2017 | Gross et al. |
| 2017/0174556 | A1 | 6/2017 | Myabe et al. |
| 2017/0197384 | A1* | 7/2017 | Finkeldey ........ B32B 17/10137 |
| 2017/0197870 | A1 | 7/2017 | Finkeldey et al. |
| 2017/0305786 | A1 | 10/2017 | Roussev et al. |
| 2017/0355640 | A1 | 12/2017 | Oram et al. |
| 2018/0046220 | A1* | 2/2018 | Kim ................ H01L 23/4985 |
| 2018/0132371 | A1* | 5/2018 | Yeum ................ H05K 5/03 |
| 2018/0147114 | A1* | 5/2018 | DeMartino ............ C03C 3/083 |
| 2018/0230044 | A1 | 8/2018 | Ozeki et al. |
| 2018/0257982 | A1 | 9/2018 | Lee et al. |
| 2018/0297892 | A1* | 10/2018 | Lee ........................ B32B 17/06 |
| 2018/0319706 | A1 | 11/2018 | Murayama et al. |

FOREIGN PATENT DOCUMENTS

| | | |
|---|---|---|
| JP | 2018100214 | 6/2018 |
| JP | 2018131358 | 8/2018 |
| KR | 1020140027861 | 3/2014 |
| KR | 1020160130914 | 11/2016 |
| KR | 10-2018-0104237 | 9/2018 |
| KR | 10-2018-0116097 | 10/2018 |
| KR | 1020190019223 | 2/2019 |
| KR | 1020190124278 | 11/2019 |

\* cited by examiner

WINDOW AND METHOD OF MANUFACTURING THE SAME

CROSS-REFERENCE TO RELATED APPLICATION

This U.S. non-provisional patent application claims priority under 35 U.S.C. § 119 of Korean Patent Application No. 10-2019-0063793, filed on May 30, 2019, the entire contents of which are hereby incorporated by reference.

TECHNICAL FIELD

The present disclosure herein relates to a window and a method of manufacturing the same, and more particularly, to a window used as a cover glass of an electronic device and a method of manufacturing the same.

DISCUSSION OF THE RELATED ART

An electronic device may include a window, a housing, and various electronic elements disposed therein. One such electronic element may be a display device for displaying an image. The various electronic elements may also include a touch sensor as well as one or more elements for generating and/or detecting light and/or sound.

The window protects the electronic elements and provides a user with an active region in which a display may be seen and in which the user may register touch inputs. Accordingly, the user provides an input to the electronic elements or receives information generated by the electronic elements, through the window. Further, the electronic elements may be stably protected from external impact due to the window.

In recent years, the trend of slimming electronic devices demands a lighter and thinner window, and to compensate for structural weakness resulting therefrom, a method of toughening a window has been studied by which excellent strength and surface durability are provided.

SUMMARY

The present disclosure provides a window having increased compressive stress and impact strength of a surface.

In addition, the present disclosure provides a method of manufacturing a window, which includes a toughening process for increasing compressive stress and impact strength of a surface.

An embodiment of the present inventive concept provides a window including a base region and a compressive stress region which is disposed on the base region. The compressive stress region includes $Li^+$, $Na^+$, and $K^+$ ions, and further includes a first compressive stress portion in which, from a surface of the window toward the base region, the concentration of the $K^+$ ion decreases, and the concentration of the $Na^+$ ion and the concentration of the $Li^+$ ion increase. A second compressive stress portion is adjacent to the first compressive stress portion. In the second compressive stress portion, from the first compressive stress portion toward the base region, the concentration of the $Na^+$ ion decreases and the concentration of the $Li^+$ ion increases.

In an embodiment of the present inventive concept, the first compressive stress portion may have a first compressive stress pattern in which a compressive stress value decreases with a first slope from the surface toward the base region. The second compressive stress portion may have a second compressive stress pattern in which the compressive stress value decreases with a second slope different from the first slope, from the first compressive stress portion toward the base region. Each of the first slope and the second slope may represent a decrease in the compressive stress value as a depth inside the window increases in a direction from the surface toward the base region.

In an embodiment of the present inventive concept, the first slope may be greater than the second slope.

In an embodiment of the present inventive concept, a density at the first compressive stress portion may be greater than a density at the second compressive stress portion.

In an embodiment of the present inventive concept, the second compressive stress portion might not comprise the $K^+$ ion.

In an embodiment of the present inventive concept, the thickness of the compressive stress region may be within a range from about 130 μm to about 150 μm.

In an embodiment of the present inventive concept, the thickness of the first compressive stress portion may be within a range from about 5 μm to about 15 μm In an embodiment of the present inventive concept, a compressive stress value at the surface may be about 650 MPa or larger.

In an embodiment of the present inventive concept, the base region may include $SiO_2$ of from about 50 wt % to about 80 wt %, $Al_2O_3$ of from about 10 wt % to about 30 wt %, and $Li_2O_3$ of from about 3 wt % to about 20 wt %.

In an embodiment of the present inventive concept, the window may include a flat portion and at least one bent portion adjacent to the flat portion.

In an embodiment of the present inventive concept, a window includes a compressive stress region at a surface thereof. The compressive stress region includes a first compressive stress portion in which, from the surface toward a center of the window, the concentration of $K^+$ ion decreases, and the concentration of $Na^+$ ion and the concentration of $Li^+$ ion increase. A second compressive stress portion is adjacent to the first compressive stress portion. In the second compressive stress portion, from the first compressive stress portion toward the center, the concentration of the $Na^+$ ion decreases and the concentration of the $Li^+$ ion increases.

In an embodiment of the present inventive concept, the first compressive stress portion may have a first compressive stress pattern in which a compressive stress value decreases with a first slope from the surface toward the center. The second compressive stress portion may have a second compressive stress pattern in which the compressive stress value decreases with a second slope greater than the first slope, from the first compressive stress portion toward the center. Each of the first slope and the second slope may represent a decrease in the compressive stress value as a depth inside the window increases from the surface toward the center.

In an embodiment of the present inventive concept, a method of manufacturing a window includes providing a base glass and toughening the base glass. The toughening of the base glass includes performing a first toughening of the base glass in a first toughening molten salt, performing a second toughening of the base glass in a second toughening molten salt, and performing a third toughening of the base glass in a third toughening molten salt. The first to third toughening molten salts each include $KNO_3$ and $NaNO_3$, and the weight percentage of the $KNO_3$ in the second toughening molten salt is greater than the weight percentages of the $KNO_3$ in the first toughening molten salt and the third toughening molten salt.

In an embodiment of the present inventive concept, the weight ratio of the $KNO_3$ and the $NaNO_3$ in the second toughening molten salt may be within a range from about 91:9 to about 90:10.

In an embodiment of the present inventive concept, each of the weight ratios of the $KNO_3$ and the $NaNO_3$ in the first toughening molten salt and the third toughening molten salt may be within a range from about 40:60 to about 60:40.

In an embodiment of the present inventive concept, the base glass may include $SiO_2$, $Al_2O_3$, and $Li_2O_3$.

In an embodiment of the present inventive concept, the base glass may include $SiO_2$ of from about 50 wt % to about 80 wt %, $Al_2O_3$ of from about 10 wt % to about 30 wt %, and $Li_2O_3$ of from about 3 wt % to about 20 wt %.

In an embodiment of the present inventive concept, the base glass may further include $Na_2O$.

In an embodiment of the present inventive concept, the toughening of the base glass may be performed at a temperature of from about 350° C. to about 450° C.

In an embodiment, the first toughening molten salt may further include $H_2O_3Si$ or zeolite.

BRIEF DESCRIPTION OF THE FIGURES

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1:
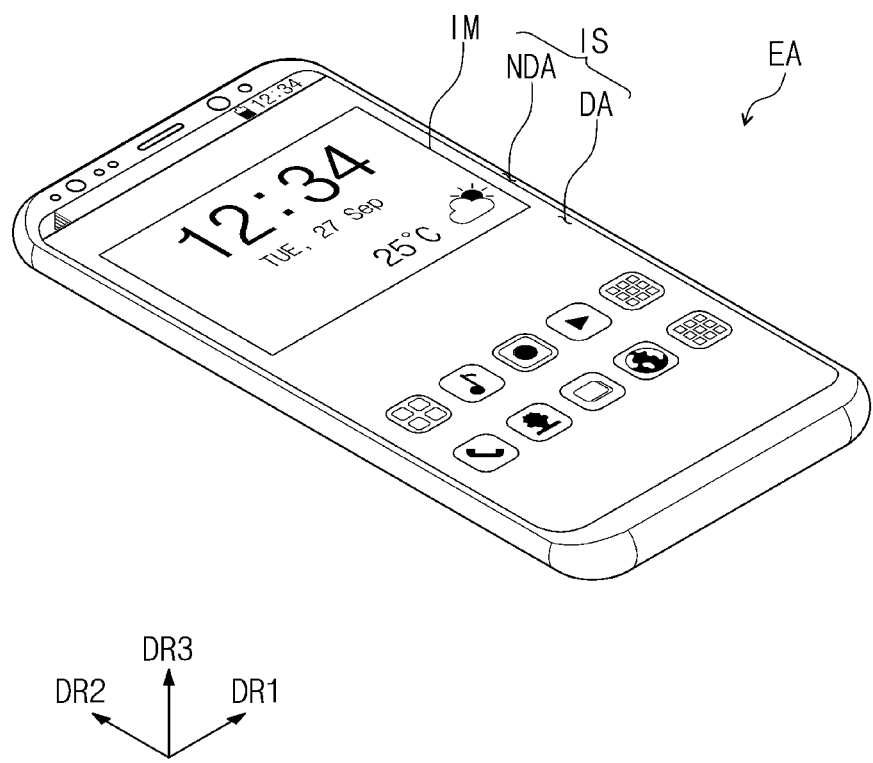
FIG. 1 is a perspective view illustrating an electronic device according to an embodiment of the present inventive concept.

In describing embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

It will be understood that when an element or layer is referred to as being "on", "connected to" or "coupled to" another element or layer, it can be directly on, connected or coupled to the other element or layer, or intervening elements or layers may be present.

Like reference numerals may refer to like elements throughout this specification and figures. In the figures, the thicknesses, ratios and dimensions of elements may be exaggerated for effective description of the technical contents.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention. As used herein, the singular forms, "a", "an" and "the" are intended to include the plural forms as well, unless the context clearly indicates otherwise.

Spatially relative terms, such as "beneath", "below", "lower", "above", and "upper", may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Hereinafter, a window, according to an embodiment of the present inventive concept, and a method of manufacturing a window, according to an embodiment of the present inventive concept, will be described herein with reference to the accompanying drawings.

Figure 2:
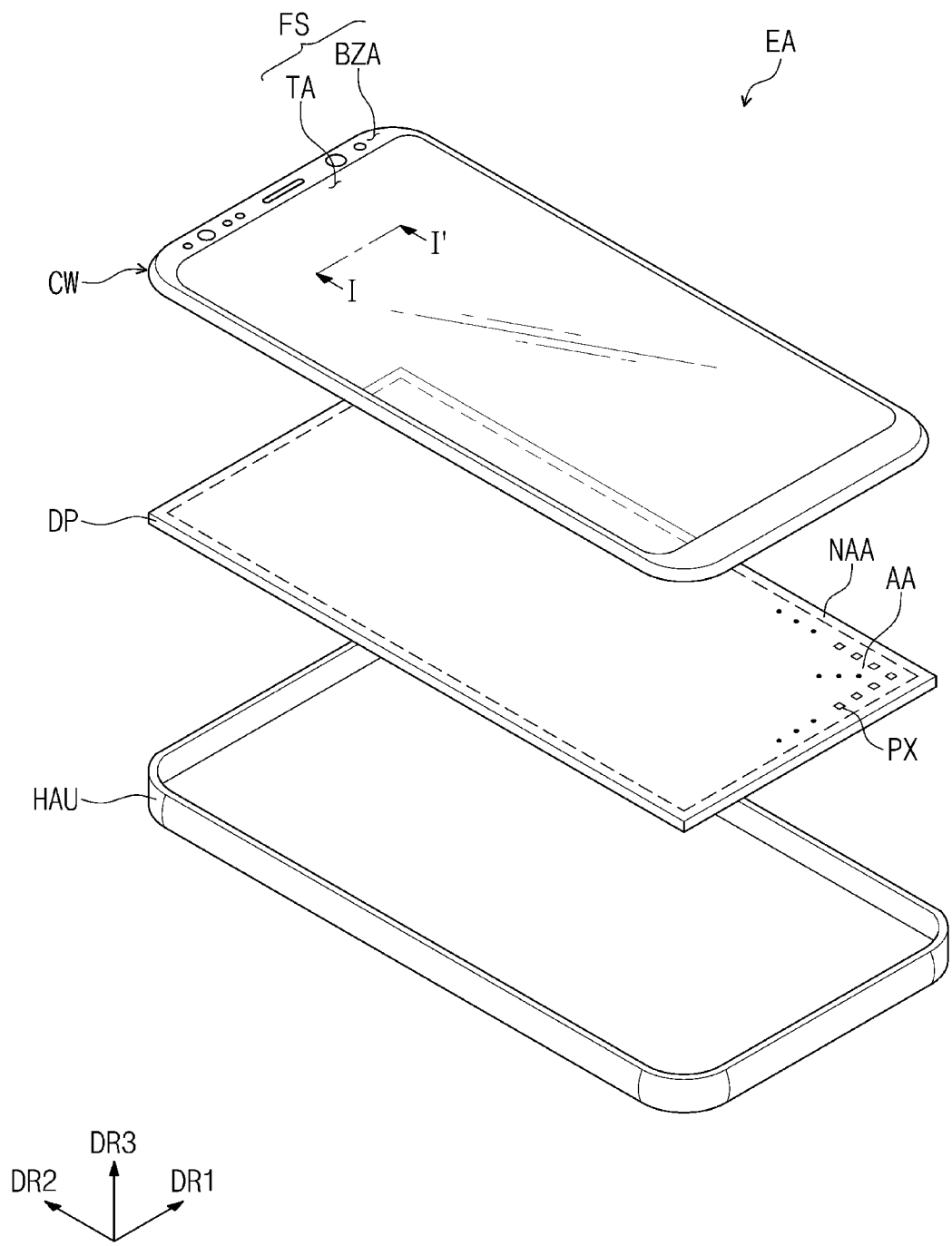
FIG. 2 is an exploded perspective view illustrating the electronic device illustrated in FIG. 1.
Figure 3:
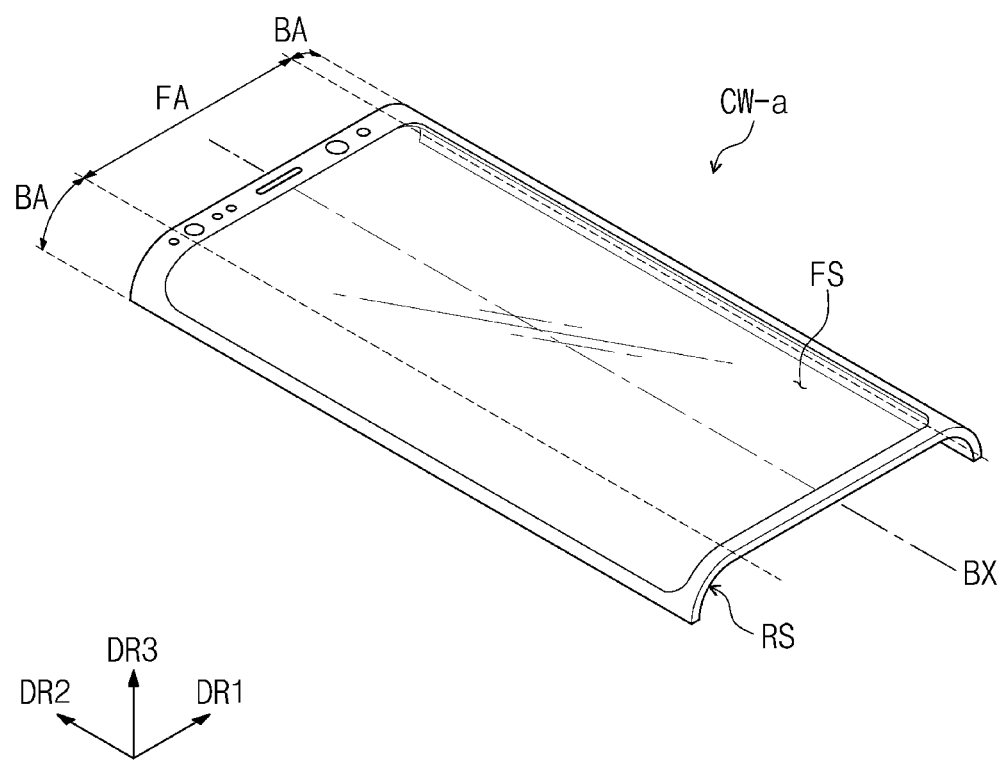
FIG. 3 is a perspective view illustrating a window according to an embodiment of the present inventive concept.
Figure 4:
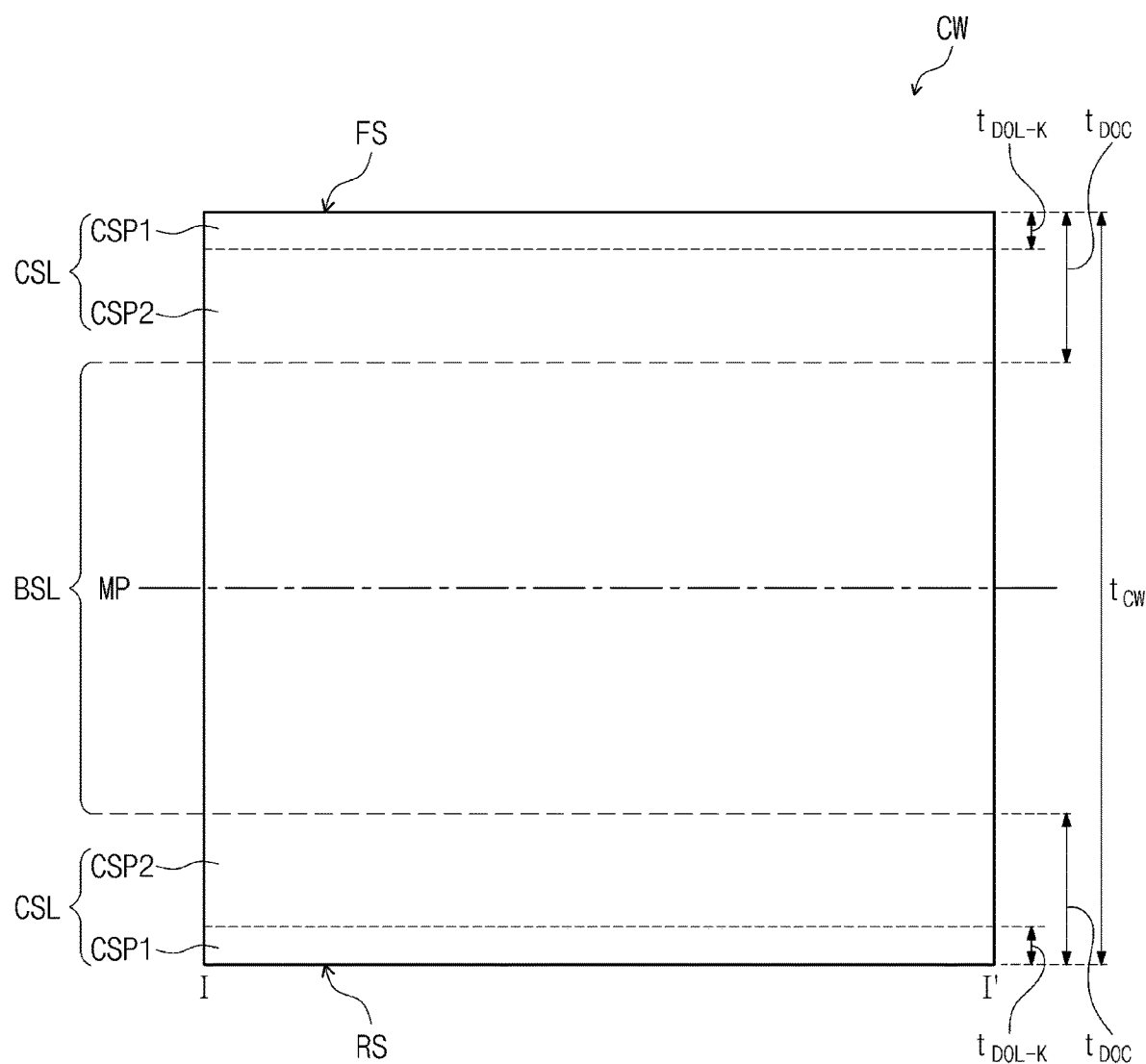
FIG. 4 is a cross-sectional view illustrating a window of an embodiment of the present inventive concept.
Figure 5A:
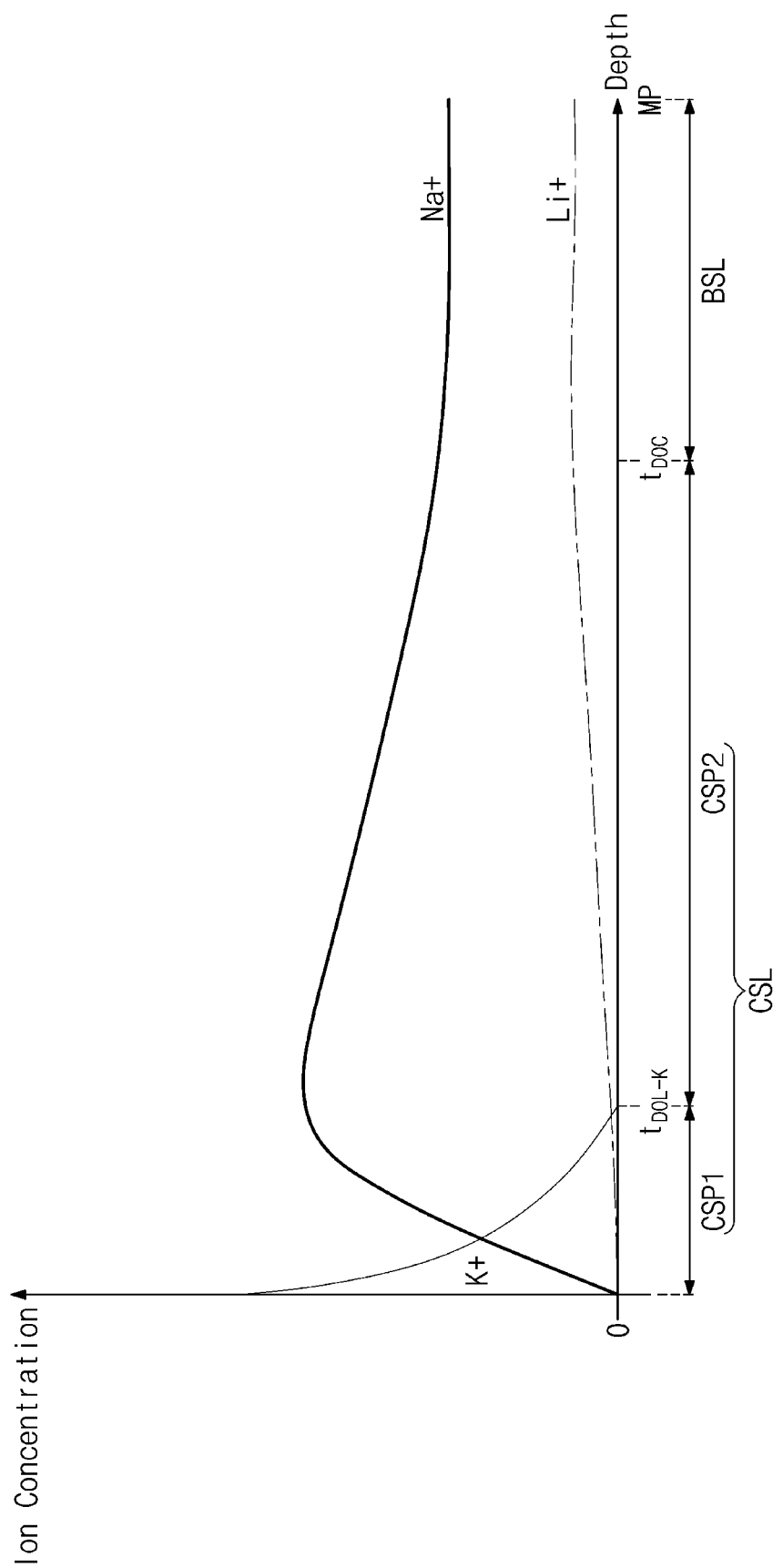
FIG. 5A is a graph schematically illustrating an ion concentration distribution in the window of an embodiment of the present inventive concept.
Figure 5B:
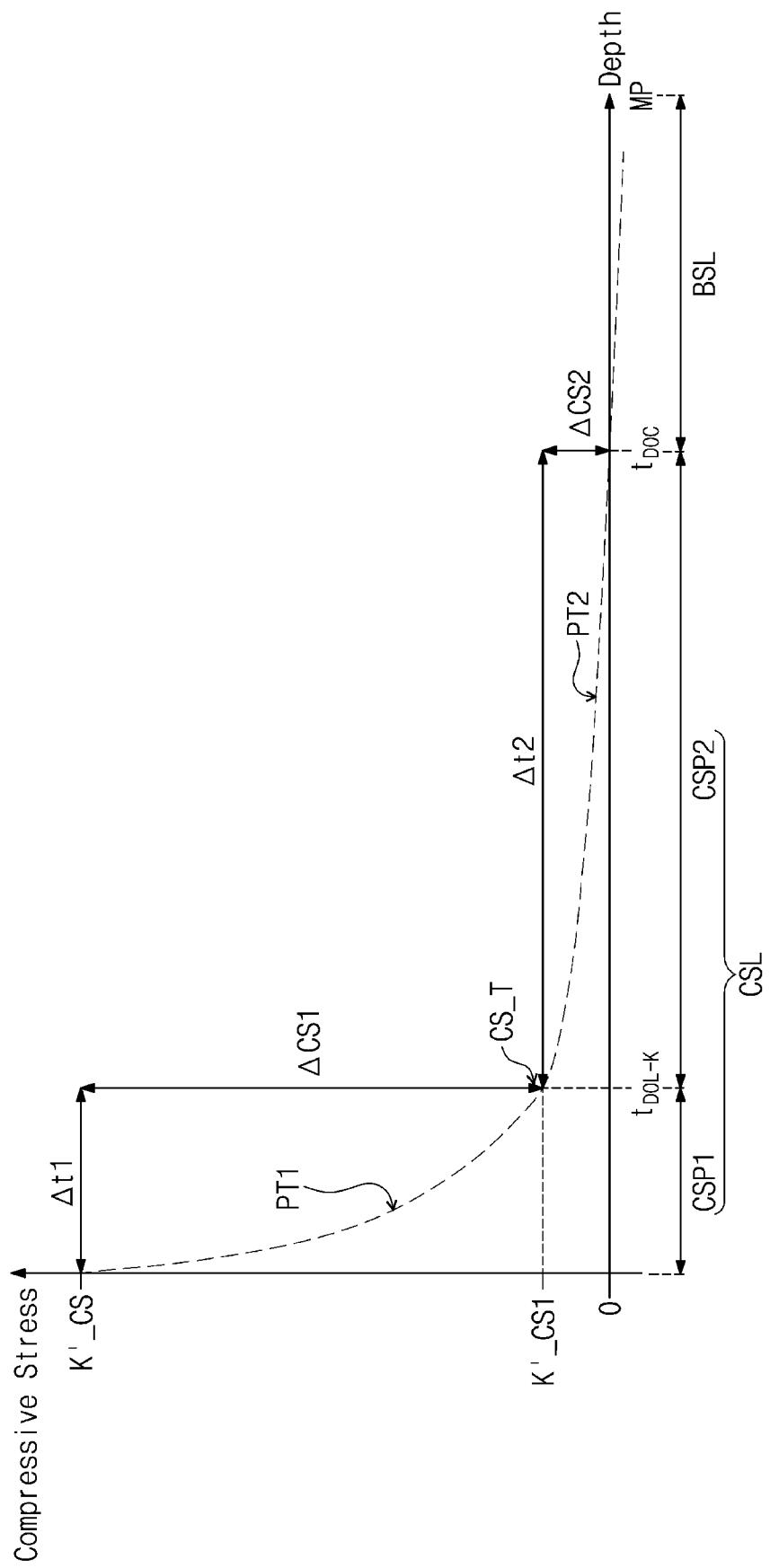
FIG. 5B is a graph schematically illustrating a compressive stress profile in the window of an embodiment of the present inventive concept.

FIG. 1 is a perspective view illustrating an electronic device in accordance with an embodiment of the present inventive concept. In FIG. 1, an electronic device including a window is shown. FIG. 2 is an exploded perspective view of the electronic device illustrated in FIG. 1. FIG. 3 is a perspective view of a window according to an embodiment of the present inventive concept. FIG. 4 is a cross-sectional view of the window. FIG. 5A shows an ion concentration distribution in the window, and FIG. 5B shows a compressive stress profile in the window.

The electronic device EA may be embodied as a smart phone, a smart watch, a personal computer, a tablet computer, a laptop/notebook/Ultrabook computer, a desktop computer monitor, a television set or the like. The electronic device EA may include various embodiments such as a display device, elements for generating sound/light, elements for sensing sound/light and one or more other electronic elements.

The electronic device EA may display an image IM in a third direction DR3 on a display surface IS that is parallel to a plane defined by a first direction DR1 and a second direction DR2. The display surface IS on which the image IM is displayed may correspond to a front surface of the electronic device EA and a front surface FS of a window CW. Further, the electronic device EA may have a three-dimensional shape having a predetermined thickness in the third direction DR3 that is perpendicular to the plane defined by the first direction DR1 and the second direction DR2.

The display surface IS in the electronic device EA illustrated in FIG. 1 may include a display region DA and a non-display region NDA adjacent to the display region DA.

The non-display region NDA may at least partially surround the display region DA. The non-display region NDA is illustrated as fully surrounding the display region DA, but the present inventive concept is not limited thereto. The display region DA is a region in which the image IM is provided and thus may correspond to an active region AA of a display panel DP. The image IM may be a still image and/or a dynamic image. A clock window is illustrated in FIG. 1 as an example of the image IM.

In this embodiment, the terms front/top surface and rear/bottom surface are defined in relation to a direction in which the image IM is displayed. The front surface and the rear surface may be opposed to each other in relation to the third direction DR3, and a normal direction of each of the front surface and the rear surface may be parallel to the third direction DR3. The first to third directions DR1 to DR3 are a relative concept and may be converted into different directions.

The electronic device EA includes the window CW, the display panel DP, and a housing HAU. In the electronic device EA, as shown in FIGS. 1 and 2, the window CW and the housing HAU may be combined to constitute the exterior of the electronic device EA.

The front surface FS of the window CW defines the front surface of the electronic device EA, as described in detail. The front surface FS of the window CW may include a transmissive region TA in which light may pass and a bezel region BZA in which light may be at least partially blocked.

The transmissive region TA may be an optically transparent region. For example, the transmissive region TA may be a region having a visible light transmittance of about 90% or greater.

The bezel region BZA may have a lower light transmittance than the transmissive region TA. The bezel region BZA may define the shape of the transmissive region TA. The bezel region BZA may be adjacent to and may at least partially surround the transmissive region TA.

The bezel region BZA may be of a particular color such as black. The bezel region BZA may cover a peripheral region NAA of the display panel DP to block the peripheral region NAA from being viewed from the outside. This is illustrated in the figures by way of example, however, the bezel region BZA may be omitted from the window CW according to an embodiment of the present inventive concept.

The window CW may include a glass substrate. For example, the window CW may be a toughened glass substrate that has undergone a toughening process. The window CW may provide the transmissive region TA by utilizing the light transmittance of the glass and may stably protect the display panel DP from external impact by virtue of including a toughened surface.

The window CW may be manufactured in accordance with the methods set forth herein. A method of manufacturing a window in accordance with an embodiment of the present inventive concept may include multiple-stage toughening for toughening a base glass, and a toughening molten salt may be provided in each stage of the multiple-stage toughening. A detailed description of the method of manufacturing a window is provided below.

The display panel DP may be activated according to an electrical signal. In this embodiment, the display panel DP is activated to display the image IM on the display surface IS of the electronic device EA. The image IM may be viewed by a user through the transmissive region TA, and the user may receive information from the image IM. However, this is illustrated by way of example, and the display panel DP may be activated to sense an external input applied to a front surface thereof. The external input may include a touch of a user, contact or proximity of an inanimate object, pressure, light, or heat, and is not limited to any one particular embodiment.

The display panel DP may include the active region AA and the peripheral region NAA. The active region AA may be a region in which the image IM is provided. The transmissive region TA may overlap at least a portion of the active region AA.

The peripheral region NAA may be a region covered by the bezel region BZA. The peripheral region NAA may be adjacent to the active region AA. The peripheral region NAA may at least partially surround the active region AA. A drive circuit, drive wires or the like for driving the active region AA may be disposed in the peripheral region NAA.

The display panel DP may include a plurality of pixels PX. Each of the plurality of pixels PX displays a point of light in response to an electrical signal. The light displayed by the pixels PX implements the image IM. The pixel PX may include a display element. For example, the display element may be an organic light emitting element, a quantum dot light emitting element, a liquid crystal display element, an electrophoretic element, an electrowetting element, or the like.

The housing HAU may be disposed below the display panel DP. The housing HAU may include a relatively stiff/rigid material. For example, the housing HAU may include a plurality of frames and/or plates constituted of glass, plastic, or metal such as stainless steel or aluminum. The housing HAU defines an accommodation space for accommodating the display panel DP and other electronic elements. The display panel DP may be protected from external impact by the housing HAU.

FIG. 3 is a perspective view illustrating a window CW-a according to an embodiment of the present inventive concept. This window CW-a is illustrated in FIG. 3, and may include one or more bent portions BA that are each bent around a bending axis BX. In an embodiment of the present inventive concept, the window CW-a may include a flat portion FA and the bent portions BA. The flat portion FA may be disposed between two bent portions BA, as shown, however, in some embodiments of the present inventive concept, there might be only one bent portion BA or there may be no flat portion as the entire front surface FS may be bent.

In an embodiment of the present inventive concept, the bending axis BX may extend in the second direction DR2 and may be provided on a rear surface RS side of the window CW-a. The flat portion FA may be parallel to a plane defined by the first direction DR1 and the second direction DR2. Each of the bent portions BA may be a curved surface portion which is adjacent to the flat portion FA and each of the bent portions BA may have a curved shape. For example, referring to FIG. 3, the bent portions BA may be portions which are adjacent to opposite sides of the flat portion FA and are bent downward from the flat portion FA. However, the present inventive concept is not limited thereto, and the bent portion BA may be disposed adjacent to only one side of the flat portion FA, or the bent portions BA may be disposed adjacent to all four sides of the flat portion FA when viewed in a plane.

FIG. 4 is a cross-sectional view illustrating the window according to an embodiment of the present inventive concept. FIG. 4 is a cross-sectional view taken along line I-I' in the window CW illustrated in FIG. 2. Hereinafter, a description of the cross section of the window CW will be given.

This window may be the same as the window illustrated in FIG. 2, but the description may also be applied to the window CW-a of the embodiment illustrated in FIG. 3.

Referring to FIG. 4, the window CW includes the front surface FS and a rear surface RS, which are each external surfaces. The front surface FS of the window CW is externally exposed and defines the front surface of the electronic device EA. The rear surface RS of the window CW is opposed to the front surface FS in the third direction DIG.

The window CW may include one or more compressive stress regions CSL. Each of the compressive stress regions CSL may be formed adjacent to a surface of the window CW. The compressive stress region CSL may be formed to have a predetermined depth in a thickness direction of the window CW from the surface of the window CW. In this specification, the compressive stress region CSL may indicate a region from the front surface FS or the rear surface RS, which is the surface of the window CW, to a point where compressive stress becomes zero. Referring to FIG. 4, the window CW may include two compressive stress regions CSL which are respectively disposed adjacent to the front surface FS and the rear surface RS, and are formed to be symmetrical with respect to a center line MP of the window CW. However, the present invention is not limited thereto, and the compressive stress region CSL may be provided adjacent to only the front surface FS of the window CW, or the compressive stress regions CSL adjacent to the front surface FS and the rear surface RS may be provided asymmetrically with respect to the center line MP of the window CW.

In the window CW of an embodiment of the present inventive concept, a base region BSL may be provided between the compressive stress regions CSL. The base region BSL may be a region where ion exchange by a toughening molten salt does not occur during the toughening of the base glass in manufacturing the window.

The compressive stress region CSL may include $Li^+$, $Na^+$, and $K^+$ ions. The compressive stress region CSL may include a first compressive stress portion CSP1 adjacent to the front surface FS or the rear surface RS, which is "the surface," and a second compressive stress portion CSP2 adjacent to the base region BSL. The second compressive stress portion CSP2 may be a portion disposed adjacent to the first compressive stress portion CSP1.

FIG. 5A shows distributions of $Li^+$, $Na^+$, and $K^+$ ion concentrations for the window CW according to an embodiment of the present inventive concept. In FIG. 5A, the abscissa represents depth from depth of zero, which is the surface of the window CW, toward the center line MP, and the ordinate represents relative ion concentration.

Referring to FIG. 5A, the first compressive stress portion CSP1 may be a portion in which, from the surfaces FS and RS toward the base region BSL, the concentration of the $K^+$ ion decreases and the concentration of the $Na^+$ ion and the concentration of the $Li^+$ ion increase. In the second compressive stress portion CSP2, the concentration of the $Na^+$ ion may decrease and the concentration of the $Li^+$ ion may increase, in a direction toward the base region BSL.

In the window CW, the first compressive stress portion CSP1 may include each of the $Li^+$, $Na^+$, and $K^+$ ions, and the second compressive stress portion CSP2 may include the $Li^+$ and $Na^+$ ions but might not include the $K^+$ ion. On the other hand, the concentration of the $Li^+$ ion and the concentration of the $Na^+$ ion in the base region BSL may be maintained at a constant level.

The first compressive stress portion CSP1 may correspond to a compressive stress region formed through second toughening step (S530; see FIG. 8) and third toughening step (S550; see FIG. 8) in the method of manufacturing a window according to an embodiment of the present inventive concept. Also, the second compressive stress portion CSP2 may correspond to a compressive stress region formed in first toughening step (S510; see FIG. 8).

A thickness $t_{DOC}$ of the compressive stress region CSL from the surface (the front surface or the rear surface) may be at least about 10% of a total thickness $t_{CW}$ of the window CW. The thickness $t_{DOC}$ of the compressive stress region CSL is a thickness in a depth direction of the window CW from the front surface FS or the rear surface RS of the window CW to a point where a compressive stress value becomes zero.

In addition, a thickness $t_{DOL-K}$ of the first compressive stress portion CSP1 may represent a thickness from the front surface FS or the rear surface RS of the window CW to a point where the concentration of the $K^+$ ion becomes zero. For example, the first compressive stress portion CSP1 may be a layer formed by $K^+$ ion exchange.

The thickness $t_{DOC}$ of the compressive stress region CSL may be within a range from about 130 μm to about 150 μm. Further, the thickness $t_{DOL-K}$ of the first compressive stress portion CSP1 may be within a range from about 5 μm to about 15 μm. The window CW may have improved impact resistance by including a compressive stress region CSL having a thickness that is at least about 10% of the total thickness $t_{CW}$.

The thickness $t_{CW}$ of the window CW may be within a range from about 0.3 mm to about 1.0 mm. For example, the thickness $t_{CW}$ of the window CW of an embodiment of the present inventive concept may be within a range from about 0.7 mm to about 0.9 mm. The window CW may be used as a cover window of the electronic device EA (see FIG. 1) described in detail to make the electronic device EA (see FIG. 1) slimmer and lighter, by having a small thickness ranging from about 0.3 mm to about 1.0 mm.

The window CW may be provided by chemically toughening a base glass including $SiO_2$, $Al_2O_3$, and $Li_2O_3$. Thus, the base region BSL may include the $SiO_2$, $Al_2O_3$, and $Li_2O_3$. The base region BSL may include $SiO_2$ of from about 50 wt % to about 80 wt %, $Al_2O_3$ of from about 10 wt % to about 30 wt %, and $Li_2O_3$ of from about 3 wt % to about 20 wt %.

FIG. 5A shows the ion concentration distributions of the alkali ions (the $Li^+$, $Na^+$, and $K^+$ ions) from one surface to the center line MP, but the ion concentration distributions of the alkali ions (the $Li^+$, $Na^+$, and $K^+$ ions) from the other surface to the center line MP may also be shown likewise.

In the window CW of an embodiment, density may be highest in the first compressive stress portion CSP1 and may become lower toward the center line MP. Density in the second compressive stress portion CSP2 may be lower than density in the first compressive stress portion CSP1, and higher than density in the base region BSL.

FIG. 5B exemplarily shows a compressive stress profile in the window CW of an embodiment of the present inventive concept. FIG. 5B may be a graph showing a compressive stress profile of a window CW manufactured by the method of manufacturing a window to be described later. In FIG. 5B, the arrow direction representing compressive stress corresponds to a direction in which the compressive stress increases. The compressive stress profile from one surface to the center line MP is shown in FIG. 5B, but a compressive stress profile from the other surface to the center line MP may also be shown similarly.

Referring to FIG. 5B, the window CW of an embodiment may have a highest compressive stress value on the front surface FS and the rear surface RS, and have a gradually decreasing compressive stress value toward the center line MP of the window CW. A compressive stress value may be negative beyond the thickness $t_{DOC}$ of the compressive stress region CSL. A negative compressive stress value may represent a tensile force.

The compressive stress profile in the compressive stress region CSL may have at least one inflection point CS_T. In FIG. 5B, the inflection point CS_T may appear at a portion corresponding to a boundary between the first compressive stress portion CSP1 and the second compressive stress portion CSP2. The window CW may exhibit a compressive stress profile including at least one inflection point CS_T.

In the window CW of an embodiment of the present inventive concept, the first compressive stress portion CSP1 may have a first compressive stress pattern PT1 having a first slope, and the second compressive stress portion CSP2 may have a second compressive stress pattern PT2 having a second slope. The slopes of the compressive stress profile in the first compressive stress portion CSP1 and the second compressive stress portion CSP2 each correspond to an amount of decrease in compressive stress value as a depth inside the window CW increases from the surface of the window CW toward the base region BSL.

The first slope of the first compressive stress pattern PT1 in the first compressive stress portion CSP1 may be a ratio of an amount ΔCS1 of decrease in compressive stress value to an amount Δt1 of depth increase inside the window CW. In addition, the second slope of the second compressive stress pattern PT2 in the second compressive stress portion CSP2 may be a ratio of an amount ΔCS2 of decrease in compressive stress value to an amount Δt2 of depth increase inside the window.

Δt1 is an amount of depth increase from the surface to a depth of the thickness $t_{DOL-K}$ of the first compressive stress portion CSP1, and ΔCS1 corresponds to a difference between a compressive stress value K'_CS at the surface and a compressive stress value K'_CS1 at the inflection point CS_T. Here, Δt2 is an amount of depth increase from the depth of the thickness $t_{DOL-K}$ of the first compressive stress portion CSP1 to an end of the second compressive stress portion CSP2 opposed to the inflection point CS_T, and ΔCS2 corresponds to the compressive stress value K'_CS1 at the inflection point CS_T.

Referring to FIG. 5B, an amount of change in compressive stress value in the first compressive stress portion CSP1 may be greater than an amount of change in compressive stress value in the second compressive stress portion CSP2. For example, the first slope may be greater than the second slope. The inflection point CS_T occurring in the compressive stress profile may be a point at which the first slope of the first compressive stress pattern PT1 is changed to the second slope of the second compressive stress pattern PT2.

A compressive stress value at the surface of the window CW may be greater than or equal to about 650 MPa. By having a maximum surface compressive stress value of about 650 MPa or greater, the window CW may have excellent impact resistance.

Figure 6A:
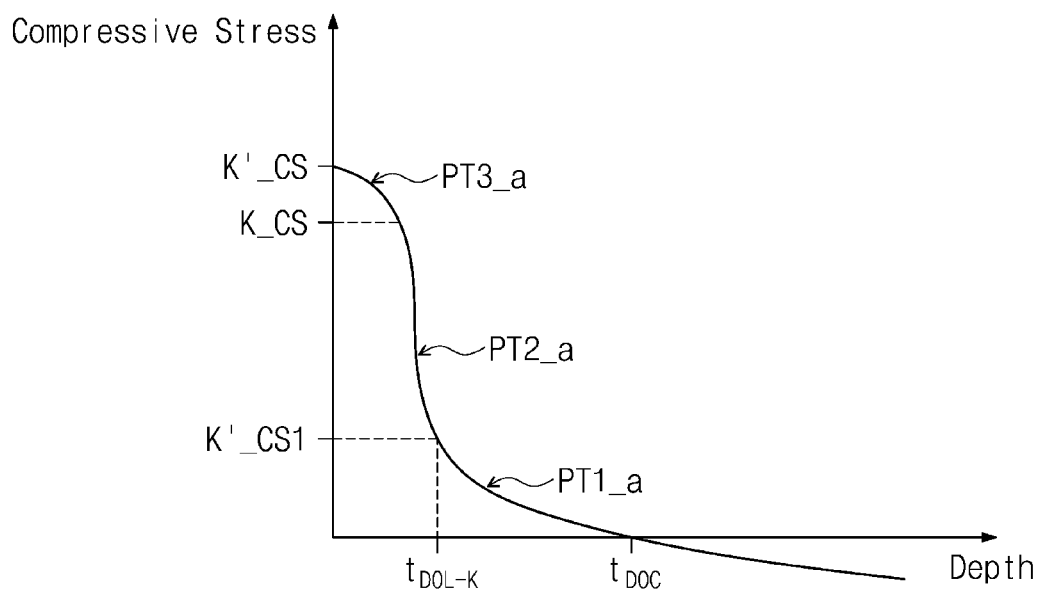
FIGS. 6A to 6C are each a graph schematically illustrating a compressive stress distribution in the window of an embodiment of the present inventive concept.
Figure 6B:
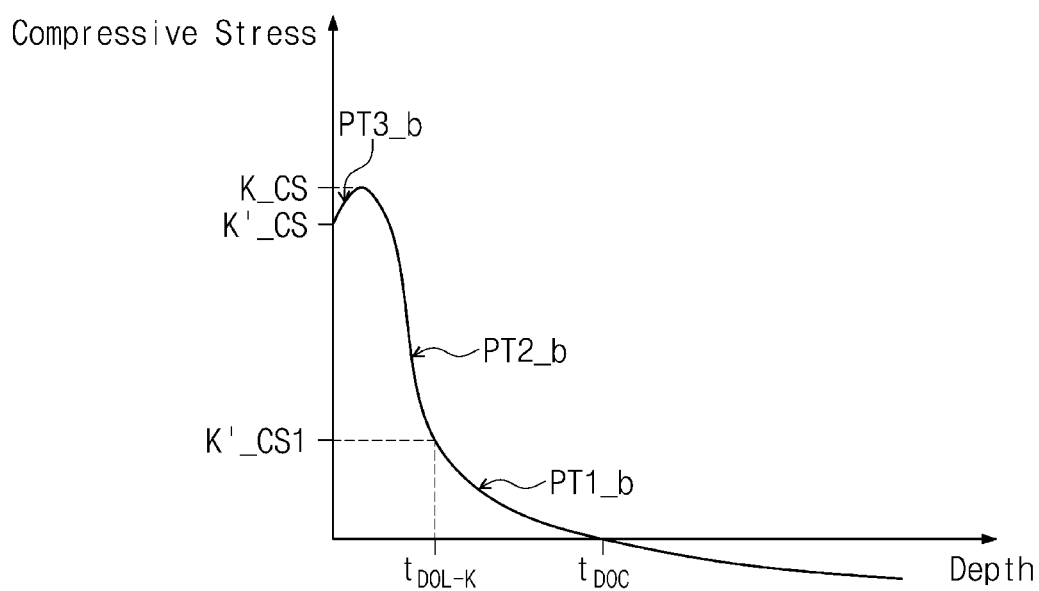
Figure 6C:
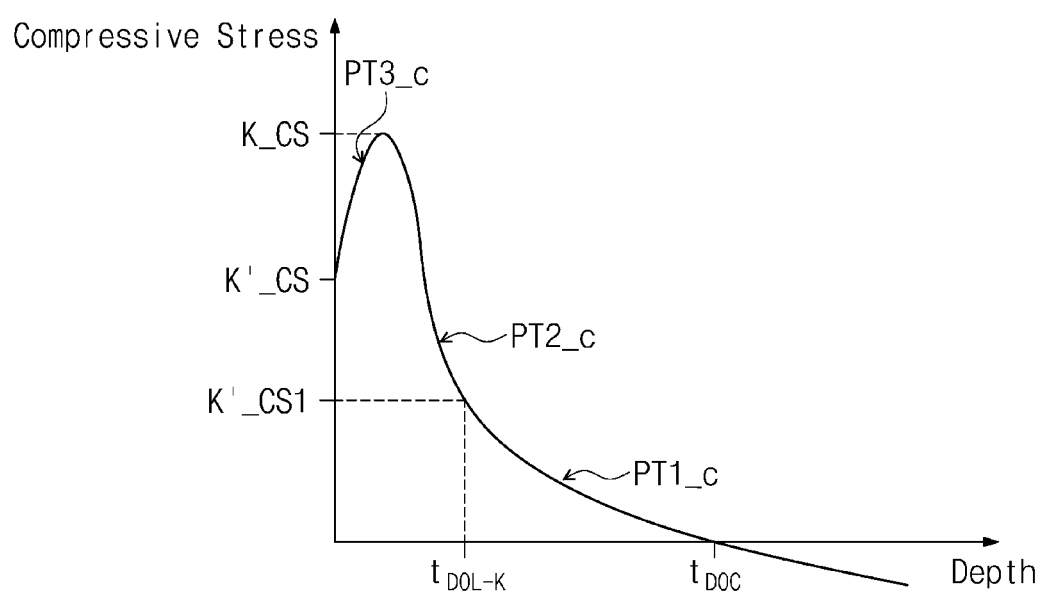

FIGS. 6A to 6C each show, by way of example, an embodiment of a compressive stress profile in the window. Each of compressive stress profiles shown in FIGS. 6A to 6C may include three pattern portions while the compressive stress profile shown in FIG. 5B has the two compressive stress patterns.

First pattern portions PT1_a, PT1_b, and PT1_c correspond to the compressive stress profile in the second compressive stress portion CSP2 (see FIG. 4). Second pattern portions PT2_a, PT2_b, and PT2_c and third pattern portions PT3_a, PT3_b, and PT3_c correspond to the compressive stress profile in the first compressive stress portion CSP1 (see FIG. 4). The third pattern portions PT3_a, PT3_b, and PT3_c respectively correspond to compressive stress profiles from the surface of the window to inflection points in the first compressive stress portion CSP1 (see FIG. 4). The second pattern portions PT2_a, PT2_b, and PT2_c respectively correspond to compressive stress profiles of portions disposed between the first pattern portions PT1_a, PT1_b, and PT1_c and the third pattern portions PT3_a, PT3_b, and PT3_c. For example, the second pattern portions PT2_a, PT2_b, and PT2_c respectively correspond to profiles of change of compressive stress from compressive stress value K_CS included in the first compressive stress portion CSP1 (see FIG. 4) to the compressive stress value K'_CS1 at the depth of the thickness $t_{DOL-K}$.

The compressive stress profiles shown in FIGS. 6A to 6C may represent compressive stress for the window manufactured by the method of manufacturing a window of an embodiment to be described later. For example, the compressive stress profiles shown in FIGS. 6A to 6C may be obtained from performing a three-stage toughening process that proceeds sequentially. For example, the first pattern portions PT1_a, PT1_b, and PT1_c may be compressive stress profiles formed from the first toughening, and the second pattern portions PT2_a, PT2_b, and PT2_c and the third pattern portions PT3_a, PT3_b, and PT3_c may correspond to the compressive stress profiles formed by performing the second and third toughening, respectively.

In FIGS. 6A to 6C, K'_CS is the final compressive stress value at the surface, and K_CS is the compressive stress value at the inflection points where the second pattern portions PT2_a, PT2_b, and PT2_c are respectively changed to the third pattern portions PT3_a, PT3_b, and PT3_c, and K'_CS1 corresponds to the compressive stress value at the inflection points where the first pattern portions PT1_a, PT1_b, and PT1_c are respectively changed to the second pattern portions PT2_a, PT2_b, and PT2_c.

FIGS. 6A to 6C show the compressive stress profiles having the shapes, different from each other, of the third pattern portions PT3_a, PT3_b, and PT3_c. The window CW may have a compressive stress value increasing toward the surface in the third pattern portion PT3_a, as shown in FIG. 6A.

In addition, referring to FIGS. 6B and 6C, compressive stress values in the third pattern portions PT3_b and PT3_c may decrease toward the surface. FIG. 6B shows a case in which the difference is not large between the final compressive stress value K'_CS at the surface and the compressive stress value K_CS at the inflection point where the second pattern portion PT2_b is changed to the third pattern portion PT3_b. In contrast, FIG. 6C shows a case in which the final compressive stress value K'_CS at the surface is significantly smaller than the compressive stress value K_CS at the inflection point where the second pattern portion PT2_c is changed to the third pattern portion PT3_c.

Accordingly, the window may exhibit a compressive stress profile having the largest compressive stress value at the surface as shown in FIG. 5B or FIG. 6A, or may have a compressive stress profile having a slightly smaller compressive stress value at the surface as shown in FIG. 6B or FIG. 6C.

The window may have excellent surface strength by including the first compressive stress portion which is adjacent to the surface and has a relatively large slope, which is defined as the amount of decrease in compressive stress value as a depth inside the window increases from the surface toward the center of the window. The second compressive stress portion has a smaller slope of compressive stress value relative to the first compressive stress portion. Further, the window may include, in the compressive stress region, the first compressive stress portion in which, from the surface toward the center, the concentration of the $K^+$ ion decreases, the concentration of the $Na^+$ ion and the concentration of the $Li^+$ ion increase, and the second compressive stress portion in which, toward the center, the concentration of the $Na^+$ ion decreases and the concentration of the $Li^+$ ion increases, thereby having excellent impact resistance with a large surface compressive stress value.

Hereinafter, the method of manufacturing a window, according to an embodiment of the present inventive concept, will be described with reference to FIGS. 7 to 9. In the description of the method of manufacturing a window in accordance with an embodiment of the present inventive concept, a description of certain elements has been omitted to provide a simplified disclosure. It should be assumed that those elements that are not described may be at least similar to corresponding element that are described elsewhere in the disclosure.

Figure 7:
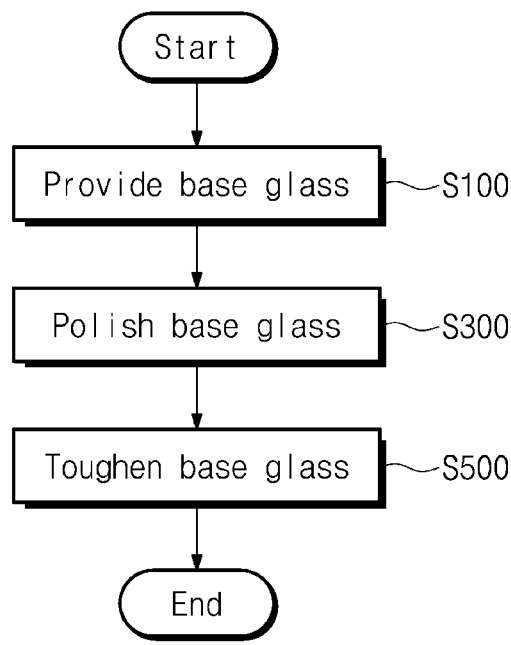
FIG. 7 is a flowchart illustrating a method of manufacturing a window according to an embodiment of the present inventive concept.
Figure 8:
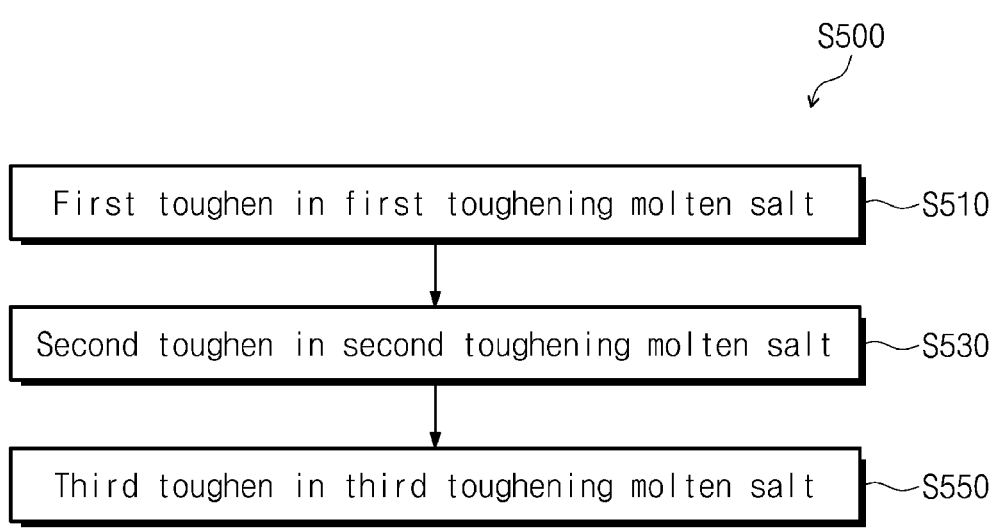
FIG. 8 is a flowchart illustrating a toughening process in a method of manufacturing a window according to an embodiment of the present inventive concept.

FIG. 7 is a flowchart illustrating the method of manufacturing a window in accordance with an embodiment of the present inventive concept. The method of manufacturing a window may include providing a base glass (S100) and toughening the base glass (S500). In addition, the method of manufacturing a window may further include polishing the base glass (S300) after having provided the base glass (S100).

In the method of manufacturing a window according to an embodiment of the present inventive concept, the base glass having been provided (S100) may be a base glass manufactured by a float process. Also, the provided base glass may be manufactured by a down draw process or a fusion process. However, the present invention is not limited thereto, and the provided base glass may be manufactured by various methods not specified herein.

The base glass having been provided (S100) may be cut and provided before the toughening of the base glass (S500) in consideration of the use purpose. For example, the cut base glass may be provided before the polishing of the base glass (S300), and a side surface, the front surface, or the like of the cut base glass may be polished. However, the present invention is not limited thereto, and the provided base glass may be of a size not matching that of a final product to which the provided base glass is applied, and then may be cut and processed to match the size of the final product after a process of manufacturing a window therefrom.

The base glass may be flat. Alternatively, the base glass may be bent. For example, the base glass that is cut and provided in consideration of the size of the final product may be convexly or concavely bent with respect to a middle portion thereof. Alternatively, the base glass may include a bent portion in an outer portion thereof. However, the present invention is not limited thereto, and the base glass may be provided in various different shapes.

The base glass so provided (S100) may include $SiO_2$, $Al_2O_3$, and $Li_2O_3$. For example, the base glass may include $SiO_2$ of from about 50 wt % to about 80 wt %, $Al_2O_3$ of from about 10 wt % to about 30 wt %, and $Li_2O_3$ of from about 3 wt % to about 20 wt %.

In an embodiment of the present inventive concept, the base glass may include $SiO_2$, $Al_2O_3$, $Li_2O_3$, and $Na_2O$. The base glass may further include $P_2O_5$, $K_2O$, $MgO$, and/or $CaO$ in addition to $SiO_2$, $Al_2O_3$, $Li_2O_3$, and $Na_2O$.

The polishing of the base glass (S300) may be performed after the providing of the base glass (S100). The side surface of the base glass, which is a cut surface of the base glass that is cut in various ways, may be polished using an abrasive or the like. Further, the front surface of the provided base glass may be processed using an abrasive or the like.

The toughening of the base glass (S500) may be a chemically toughening of the base glass that is performed by providing a toughening molten salt to the base glass. For example, the toughening of the base glass (S500) may toughen the surface of the base glass by an ion exchange method after immersing the base glass in the toughening molten salt. The toughening molten salt provided to the base glass may include two or more kinds of alkali ions.

The toughening of the base glass (S500) may be achieved by exchanging alkali metal ions having a relatively small ionic radius on the surface of the base glass for alkali metal ions having a larger ionic radius. For example, the toughening of the surface may be achieved by exchanging $Li^+$ ions and $Na^+$ ions on the surface of the base glass for $Na^+$ ions and $K^+$ ions provided in the toughening molten salt, respectively. The window CW manufactured through the toughening of the base glass (S500) may include the compressive stress region CSL (see FIG. 4) on a surface thereof. The compressive stress region CSL (see FIG. 4) may be formed on the front surface FS and/or the rear surface RS of the window CW.

In the method of manufacturing a window according to an embodiment of the present inventive concept, the toughening of the base glass (S500) may include three-stage toughening. FIG. 8 is a flowchart illustrating the toughening of the base glass (S500) in the method of manufacturing a window in accordance with an embodiment of the present inventive concept. The toughening of the base glass (S500) may include first toughening in a first toughening molten salt (S510), second toughening in a second toughening molten salt (S530), and third toughening in a third toughening molten salt (S550). The first to third toughening steps (S510, S530, and S550) in the method of manufacturing a window of an embodiment may be sequentially performed. The first to third toughening steps (S510, S530, and S550) may be performed through separate processes, respectively.

Each of the first to third toughening molten salts provided in the first to third toughening steps (S510, S530, and S550) may be a molten salt including two or more kinds of ions from among $Li^+$, $Na^+$, $K^+$, $Rb^+$, and $Cs^+$. For example, each of the toughening molten salts provided in the first to third toughening steps (S510, S530, and S550) may include a molten salt of $KNO_3$ and $NaNO_3$ as a mixed salt.

The weight percentages of $KNO_3$ and $NaNO_3$ in the toughening molten salts provided in the first to third toughening steps (S510, S530, and S550) may vary stage by stage. For example, the weight percentages of $KNO_3$ and $NaNO_3$ included in the second toughening molten salt used in the second toughening steps (S530) may respectively be different from the weight percentages of $KNO_3$ and $NaNO_3$ included in the first toughening molten salt used in the first toughening steps (S510). In addition, the weight percentages of $KNO_3$ and $NaNO_3$ included in the second toughening molten salt used in the second toughening steps (S530) may respectively be different from the weight percentages of $KNO_3$ and $NaNO_3$ included in the third toughening molten salt used in the third toughening steps (S550). The weight percentage of $KNO_3$ in the second toughening molten salt may be greater than the weight percentage of $KNO_3$ in the first toughening molten salt or the third toughening molten salt.

For example, the weight ratio of $KNO_3$ and $NaNO_3$ in the second toughening molten salt may be within a range from about 91:9 to about 90:10. For example, the second toughening molten salt may include a relatively larger amount of $KNO_3$ among $KNO_3$ and $NaNO_3$.

The first toughening molten salt used in the first toughening steps (S510) of the method of manufacturing a window may include $KNO_3$ and $NaNO_3$ in a weight ratio of 50:50. By comparison, the second toughening molten salt used in the second toughening steps (S530) may include $KNO_3$ and $NaNO_3$ in a weight ratio of 92:8. In addition, the third toughening molten salt used in the third toughening steps (S550) may include $KNO_3$ and $NaNO_3$ in a weight ratio of 50:50.

Also, in a method of manufacturing a window in accordance with embodiments of the present inventive concept, the third toughening steps (S550) may be performed for a shorter time than the first toughening step (S510) or the second toughening step (S530). For example, while the first toughening step (S510) and the second toughening step (S530) each last from about 120 minutes to about 240 minutes, the third toughening step (S550) may be performed from about 10 minutes to about 60 minutes.

In the method of manufacturing a window, the toughening of the base glass (S500) may be performed at a temperature of about 350° C. to about 450° C. For example, the toughening of the base glass (S500) may be performed at a temperature of about 380° C. to about 400° C. A process temperature of the second toughening step (S530) may be lower than a process temperature of the first toughening step (S510) or the third toughening step (S550).

The toughening molten salt in the first toughening may further include an additive. For example, the first toughening molten salt may further include $H_2O_3Si$ or zeolite in addition to $KNO_3$ and $NaNO_3$.

Figure 9:
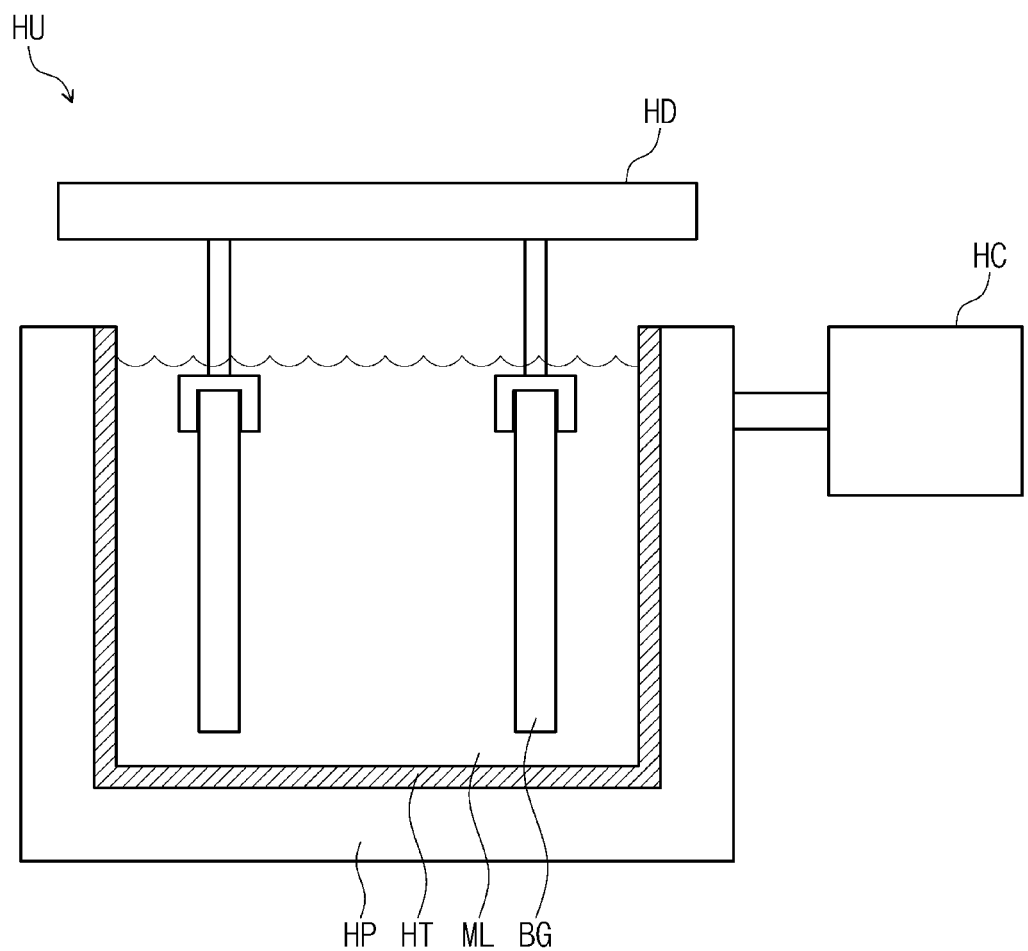
FIG. 9 is a schematic diagram illustrating a toughening process in a method of manufacturing a window according to an embodiment of the present inventive concept.

FIG. 9 schematically illustrates the toughening of the base glass (S500), which provides the toughening molten salt to toughen the base glass, in the method of manufacturing a window. FIG. 9 exemplarily illustrates a toughening processing unit HU in which the toughening step (S500) is performed. The toughening processing unit HU in FIG. 9 is schematically illustrated for describing the toughening step (S500), and the configuration of the toughening processing unit HU is not limited to that illustrated in FIG. 9.

The toughening processing unit HU illustrated in FIG. 9 may include a tank HT for containing a toughening molten salt ML in molten form. A heating unit HP is disposed so as to at least partially surround the tank HT. The heating unit HP heats the toughening molten salt ML in the tank HT. A drive unit HD fixes a provided base glass BG and moves the base glass BG in a vertical direction so as to immerse the base glass BG in the toughening molten salt ML. A control unit HC controls the operation of the toughening processing unit HU. The control unit HC may control the temperature of the toughening molten salt ML contained in the tank HT. For example, the control unit HC may control the heating unit HP so that the toughening molten salt ML is heated to a predetermined temperature and a temperature of the toughening molten salt ML is maintained at the temperature to which the toughening molten salt ML has been heated. For example, the heating unit HP may provide heat so as to heat the toughening molten salt ML, or may function as an insulating unit for maintaining the temperature of the heated toughening molten salt ML. The base glass BG may be disposed so as to be entirety immersed in the toughening molten salt ML.

Only two base glasses BG which are fixed to the drive unit HD and treated in the toughening molten salt ML are illustrated exemplarily in FIG. 9, but the inventive concept is not limited thereto. The base glass BG which is treated in the toughening molten salt ML may be singularly provided or may be provided in plurality.

Referring to FIG. 9, the toughening step (S500) may be performed in the toughening processing unit HU by immersing the base glass BG in the toughening molten salt ML. In the method of manufacturing a window in accordance with embodiments of the present inventive concept, the first to third toughening steps (S510, S530, and S550) may be performed in separate toughening processing units HU, respectively. However, the present invention is not limited thereto, and toughening stages using the same toughening molten salt may be performed in the same toughening processing unit HU.

Tables 1 and 2 below respectively show process conditions of the methods of manufacturing a window according to a Comparative Example and an Example of the present disclosure, and evaluation results of properties of the windows of the Comparative Example and the Example manufactured therefrom.

The same base glass is toughened for the Comparative Example and for the Example, the evaluation result of the window toughened through a two-stage toughening process is shown for the Comparative Example, and the evaluation result of the window toughened through a three-stage toughening process is shown for the Example.

The toughening in the method of manufacturing a window has been performed under the conditions shown in Table 1 below.

TABLE 1

| Classification | Condition | Example | Comparative Example |
|---|---|---|---|
| First Toughening | Temperature (° C.) | 395 | 395 |
| | Time (min) | 240 | 240 |
| | Ratio of Salts (K:Na) | 50:50 | 50:50 |
| Second Toughening | Temperature (° C.) | 380 | 380 |
| | Time (min) | 150 | 150 |
| | Ratio of Salts (K:Na) | 92:08 | 92:08 |
| Third Toughening | Temperature (° C.) | 395 | — |
| | Time (min) | 15 | |
| | Ratio of Salts (K:Na) | 50:50 | |

Table 2 shows the evaluation results of the windows manufactured under the conditions of the Example and the Comparative Example.

TABLE 2

| Classification | Compressive Stress (MPa) | $t_{DOC-K}$ (μm) | $t_{DOC}$ (μm) | Breakage Threshold Height (cm) |
|---|---|---|---|---|
| Example | 699.7 | 6.2 | 133.0 | 60.5 |
| Comparative Example | 681.6 | 5.8 | 138.7 | 56.0 |

A breakage threshold height shown in Table 2 is defined as a method of evaluating the surface strength of the window, and is a measured height at which the window is broken when a weight having a predetermined weight is dropped onto a ball after the ball is placed on the window to be evaluated. For example, it may be seen that as the breakage threshold height increases, the window has higher impact strength.

Referring to the results of Table 2, the window of the embodiment has similar compressive stress value and depth of the compressive stress region as compared with those of the window of the comparative example, but shows an improved breakage threshold height.

Accordingly, the method of manufacturing a window according to an embodiment of the present inventive concept may include an additional third toughening to allow the window to have, in the compressive stress region, the ion concentration distribution and the compressive stress profile different from those of the window of the comparative example, so that the window of an embodiment may have improved impact resistance even when the compressive stress value or the compressive stress region at the surface are similar to those of the window of the comparative example.

The window in accordance with an embodiment of the present inventive concept may have increased impact resistance by having a high compressive stress value at the surface and by including the first compressive stress portion and the second compressive stress portion having ion concentration distributions different from each other. In addition, in the method of manufacturing a window, the window may have a high surface compressive stress value and excellent impact resistance by including the three-stage toughening and by increasing the percentage of a salt having $K^+$ ions in the second toughening step.

In an embodiment of the present inventive concept, the window having improved surface strength characteristics may be provided by including the compressive stress portions having different concentration profiles of the alkali ions.

In an embodiment of the present inventive concept, the method of manufacturing a window having excellent impact strength may be provided by including the toughening step which has three or more stages.

Although embodiments of the present inventive concept have been described herein, it is understood that various changes and modifications can be made by those skilled in the art within the spirit and scope of the inventive concept.

What is claimed is:

1. A window comprising:
    a base region; and
    a compressive stress region disposed on the base region and including $Li^+$, $Na^+$, and $K^+$ ions,
    wherein the compressive stress region comprises:
    a first compressive stress portion in which a concentration of the $K^+$ ions decreases, a concentration of the $Na^+$ ions increases, and a concentration of the $Li^+$ ions increases, from a surface of the window toward the base region; and
    a second compressive stress portion adjacent the first compressive stress portion, wherein, in the second compressive stress portion, the concentration of the $Na^+$ ions decreases and the concentration of the $Li^+$ ions increases from the first compressive stress portion toward the base region.

2. The window of claim 1, wherein:
    the first compressive stress portion has a first compressive stress pattern in which a compressive stress value decreases with a first slope from the surface toward the base region,
    the second compressive stress portion has a second compressive stress pattern in which the compressive stress value decreases with a second slope different from the first slope, from the first compressive stress portion toward the base region, and
    each of the first slope and the second slope is defined as an amount of decrease in the compressive stress value as a depth inside the window increases in a direction from the surface toward the base region.

3. The window of claim 2, wherein the first slope is greater than the second slope.

4. The window of claim 1, wherein a density of the first compressive stress portion is greater than a density of the second compressive stress portion.

5. The window of claim 1, wherein the second compressive stress portion does not comprise $K^+$ ions.

6. The window of claim 1, wherein the thickness of the compressive stress region is within a range from about 130 μm to about 150 μm.

7. The window of claim 1, wherein the thickness of the first compressive stress portion is within a range from about 5 μm to about 15 μm.

8. The window of claim 1, wherein a compressive stress value at the surface is about 650 MPa or larger.

9. The window of claim 1, wherein the base region comprises $SiO_2$ of from about 50 wt % to about 80 wt %, $Al_2O_3$ of from about 10 wt % to about 30 wt %, and $Li_2O_3$ of from about 3 wt % to about 20 wt %.

10. The window of claim 1, wherein the window comprises a flat portion and at least one bent portion adjacent to the flat portion.

11. A window comprising a compressive stress region at a surface thereof,
    wherein the compressive stress region comprises;
    a first compressive stress portion in which a concentration of the $K^+$ ions decreases, a concentration of the $Na^+$ ions increases, and a concentration of the $Li^+$ ions increases, from the surface toward a center of the window; and
    a second compressive stress portion adjacent to the first compressive stress portion, wherein, in the second compressive stress portion, the concentration of the $Na^+$ ions decreases and the concentration of the $Li^+$ ions increases from the first compressive stress portion toward the center.

12. The window of claim 11, wherein:
    the first compressive stress portion has a first compressive stress pattern in which a compressive stress value decreases with a first slope from the surface toward the center,
    the second compressive stress portion has a second compressive stress pattern in which the compressive stress value decreases with a second slope greater than the first slope, from the first compressive stress portion toward the center, and
    each of the first slope and the second slope is an amount of decrease in the compressive stress value as a depth inside the window increases from the surface toward the center.

13. The window of claim 1, wherein the second compressive stress portion is adjacent to the first compressive stress portion and wherein the second compressive stress portion is disposed between the first compressive stress portion and the base region.

14. The window of claim 11, wherein the second compressive stress portion is adjacent to the first compressive stress portion and wherein the second compressive stress portion is disposed between the first compressive stress portion and the center of the window.

* * * * *